United States Patent [19]

Teague et al.

[11] Patent Number: 5,421,843
[45] Date of Patent: Jun. 6, 1995

[54] APPARATUS FOR REMOVING EMISSIONS

[75] Inventors: Beth O. Teague, Asheville; Dennis G. Shealy, Fletcher, both of N.C.

[73] Assignee: BASF Corporation, Mount Olive, N.J.

[21] Appl. No.: 129,530

[22] Filed: Sep. 30, 1993

[51] Int. Cl.[6] .................. B01D 29/35; B01D 53/14
[52] U.S. Cl. ...................................... 55/229; 55/242; 55/252; 55/259
[58] Field of Search ............... 55/229, 242, 244, 248, 55/250, 252, 255, 256, 259

[56] References Cited

U.S. PATENT DOCUMENTS

| | | | |
|---|---|---|---|
| 1,915,987 | 6/1933 | Fisher et al. | 55/252 X |
| 2,952,675 | 9/1960 | Bolle | 95/187 X |
| 3,047,565 | 7/1962 | Braun et al. | 95/187 X |
| 3,142,548 | 7/1964 | Krantz | 55/259 X |
| 3,242,227 | 3/1966 | Kroeper et al. | 95/187 |
| 3,540,190 | 11/1970 | Brink, Jr. | 95/278 |
| 3,618,301 | 11/1971 | Handman | 55/259 X |
| 3,619,452 | 11/1971 | Harrison et al. | 264/176 F |
| 3,739,549 | 6/1973 | Hevia et al. | 95/214 X |
| 3,763,631 | 10/1973 | Horn et al. | 55/242 X |
| 3,812,657 | 5/1974 | Lampinen | 55/223 |
| 3,971,642 | 7/1976 | Perez | 55/250 X |
| 4,084,947 | 4/1978 | Ear | 55/242 |
| 4,120,671 | 10/1978 | Steinmeyer | 55/242 X |
| 4,145,194 | 3/1979 | Horlacher, Jr. et al. | 55/242 |
| 4,155,726 | 5/1979 | Steinmeyer | 55/242 |
| 4,363,642 | 12/1982 | Stahl | 95/214 X |
| 4,676,807 | 6/1987 | Miller et al. | 55/487 X |
| 4,731,100 | 3/1988 | Loeffelmann et al. | 55/242 X |
| 4,759,782 | 7/1988 | Miller et al. | 55/487 |
| 5,122,169 | 6/1992 | Schumacher et al. | 55/259 X |
| 5,122,321 | 6/1992 | Chambers | 95/237 X |
| 5,219,585 | 6/1993 | Shealy et al. | 425/182 |

FOREIGN PATENT DOCUMENTS

| | | | |
|---|---|---|---|
| 54-138871 | 10/1979 | Japan | 55/259 |
| 791510 | 3/1958 | United Kingdom | 55/242 |
| 1583149 | 8/1990 | U.S.S.R. | 55/250 |

Primary Examiner—Robert Spitzer
Attorney, Agent, or Firm—Nixon & Vanderhye

[57] ABSTRACT

Disclosed is an apparatus for removing emissions from a broad variety of sources, especially from polymerization operations and thermoplastic polymer processing operations, which contains a header for collecting air, containing the emissions, a duct, a candle filter housing, which is connected to the header by the duct, a candle filter, located in the candle filter housing, which is connected to the duct, a nozzle for rinsing the candle filter with a solvent, which is connected to the candle filter, and a fan for moving the air through the header, duct, candle filter and candle filter housing.

12 Claims, 3 Drawing Sheets

APPARATUS FOR REMOVING EMISSIONS

FIELD OF THE INVENTION

The present invention relates generally to an apparatus for removing emissions from a broad variety of sources in the chemical, pharmaceutical, coatings, recycling and oil industry. Especially it relates to an apparatus which is suitable for removing monomer and oligomer emissions before, during and after the polymerization reaction for the manufacture of thermoplastic polymers acid during thermoplastic polymer processing operations like extrusion, injection molding and fiber spinning operations.

BACKGROUND OF THE INVENTION

In the manufacturing industry, like the chemical, pharmaceutical, coating, recycling, and oil industry, exists a broad variety of sources for emissions which are released in the environment, which is not desirable. For example, in chemical reactions, emissions of reaction components, additives and solvents may be released. During distillation, vapors of chemicals or solvents may be released. During coating of cars, vapors of coatings, additives and solvents may be released. During recycling of polymers, monomers or oligomers of the hydrolyzed polymer may be released. During cleaning of reactors, chemicals and solvents may be released.

Before, during and after the polymerization reaction for the manufacture of thermoplastic polymers like polyamides, polyester, polyolefins, polycarbonates, polystyrenes, polyacrylonitriles, polyurethanes, polysulfones, polyethersulfones, polyvinylchloride, copolymers and mixtures thereof, monomer vapors may be released in the environment from transportation tanks, storage tanks, pipelines, ducts, polymerization reactors, polymer melts, polymer strands water bath, cutters, dryers and the like, which is not desirable. During thermoplastic polymer processing like injection molding or extrusion the thermoplastic polymers are for example extruded through an extruder into strands for chip production or into films, fibers, profiles, tubes and the like. During the extrusion at a temperature of from about 180° to about 350° C., monomer or oligomer vapors, compounds formed by thermal evaporation, thermal decomposition, or vapors of additives are released from the surface of the extruded polymers, which are leaving the nozzle of the extruder. These vapors evaporate immediately into an aerosol that would form deposits in the neighborhood of the extruder and therefore must be removed, which is usually done by the quench air removal. The exhaust air is usually released into the environment, which is not desirable.

A filament quenching apparatus is known from U.S. Pat. No. 3,619,452 which comprises a quenching chamber and a gas entry chamber. The quench air exits the quenching apparatus without further treatment.

U.S. Pat. No. 4,676,807 discloses a process for removal of liquid aerosols from gaseous streams by passing the stream through a coalescing filter. In the examples oil and water aerosols were tested.

U.S. Pat. No. 4,759,782 which is a C.I.P. of an application which issued as U.S. Pat. No. 4,676,807 described above, discloses the coalescing filter for removal of liquid aerosols from gaseous streams.

U.S. Pat. No. 5,219,585 discloses a monomer exhaust system for exhausting fumes, released from a melt spinning process which has a housing, a nozzle for the collection of the fumes, a duct, a drawing force for moving the fumes and rinsing means for automatically purging said exhaust system of condensed fume deposits.

An object of the present invention was to provide an apparatus for removing emissions from a broad variety of sources.

Another object was an apparatus for the removal of emissions from polymerization operations and thermoplastic polymer processing operations.

Another object was an apparatus for removing emissions from fiber spinning operations.

SUMMARY OF THE INVENTION

The objects of the present invention could be achieved with an apparatus for removing emissions, which comprises:
  (i) a header for collecting air, containing the emissions;
  (ii) a duct;
  (iii) a candle filter housing, connected to the header by the duct;
  (iv) a candle filter, located in the candle filter housing connected to the duct; and
  (v) means for rinsing the candle filter with a solvent, connected to the candle filter.
  (vi) means for moving the air through the header, duct, candle filter and candle filter housing, connected to the candle filter housing.

DESCRIPTION OF THE PREFERRED EMBODIMENTS

The apparatus of the present invention is suitable for removing emissions from a broad variety of emission sources in the manufacturing industry like the chemical, pharmaceutical, coating, recycling and oil industry. The following two examples from the chemical industry show the applicability of the apparatus for removing emissions which are released before, during and after the polymerization reaction for the manufacture of polymers and during the thermoplastic processing of polymers into polymer articles. Articles made from thermoplastic polymers like polyamides, polyesters, polyolefins, polycarbonate, polyacrylonitrile, polyurethane, polysulfones, polyethersulfones, polyvinylchloride and the like are manufactured in several steps. One step is the polymerization of monomers to a thermoplastic polymer followed by the thermoplastic processing into the final shape of the article.

Figure 1:
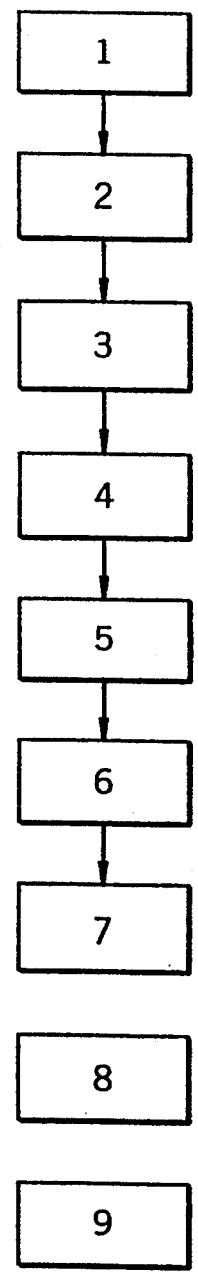
FIG. 1 is a flow chart of a polymerization operation and a thermoplastic processing operation.

FIG. 1 shows a general flow chart for the manufacture of such articles including a polymerization operation comprising the feedstock transfer (1), the feedstock processing (2), the reactor (3) and the polymer processing (4) as well as a thermoplastic processing operation comprising the thermoplastic processing (5), conditioning (6) and the final thermoplastic polymer product (7). Also included in the operation is a cleaning operation (8) and a recycling operation (9).

The feedstock transfer (1) includes the monomer transport via pipeline, truck, rail, drum, sack and the like. The feedstock processing (2) comprises storage tanks, mixing and conditioning of monomers. The reactor (3) comprises the reaction chamber where the polymerization reaction takes place and all the peripheral equipment like columns and pipes and additional feedstock equipment. After the polymerization is finished the polymer melt exits the reactor and is transformed into chips, flakes or granules in the polymer processing (4) which comprises pump blocks where the polymer melt is formed into polymer strands, a water bath for cooling the polymer strands, a cutter for cutting the polymer strands into chips and a dryer to dry the chips. In fluidized bed reactors for the manufacture of, for example, polyolefins, the polymer is formed in the form of granules which exit the reactor without further polymer processing (4).

In the thermoplastic processing operation, the thermoplastic polymer is melted, for example, in an extruder or injection molding machine which is shown as thermoplastic processing (5). The polymer exits the injection molding machine in form of a shaped article. The polymer melt exits the extruder in form of strands, films, fibers, profiles, tubes and the like, which are conditioned in the conditioning (6), which includes the treatment with quench air, finish application, drawing, texturizing, heat setting and the like to form the final thermoplastic article (7). In all seven stages, emissions may be released in the environment like monomers, oligomers, additives, solvents, decomposition products and the like. For example, emissions of monomers may be released during feedstock transfer from pipelines, trucks, rails or drums from vents of storage tanks or reactors, during polymer processing, during thermoplastic processing from the exit of the extruder or injection molding machine, during conditioning of for example, fibers with regard to quenching, finish application or heat setting.

Emissions may be released also in cleaning operations (8) of the equipment used in (1) to (7) and (9) and in recycling operations (9), where thermoplastic polymer is depolymerized in monomers, the monomers are recovered and again polymerized.

The following is a description of the apparatus of the present invention applied to fiber spinning operations as one example of the above mentioned variety of emission sources.

The apparatus for removing emissions from fiber spinning operations is described with reference to FIG. 2 and FIG. 3.

Figure 2:
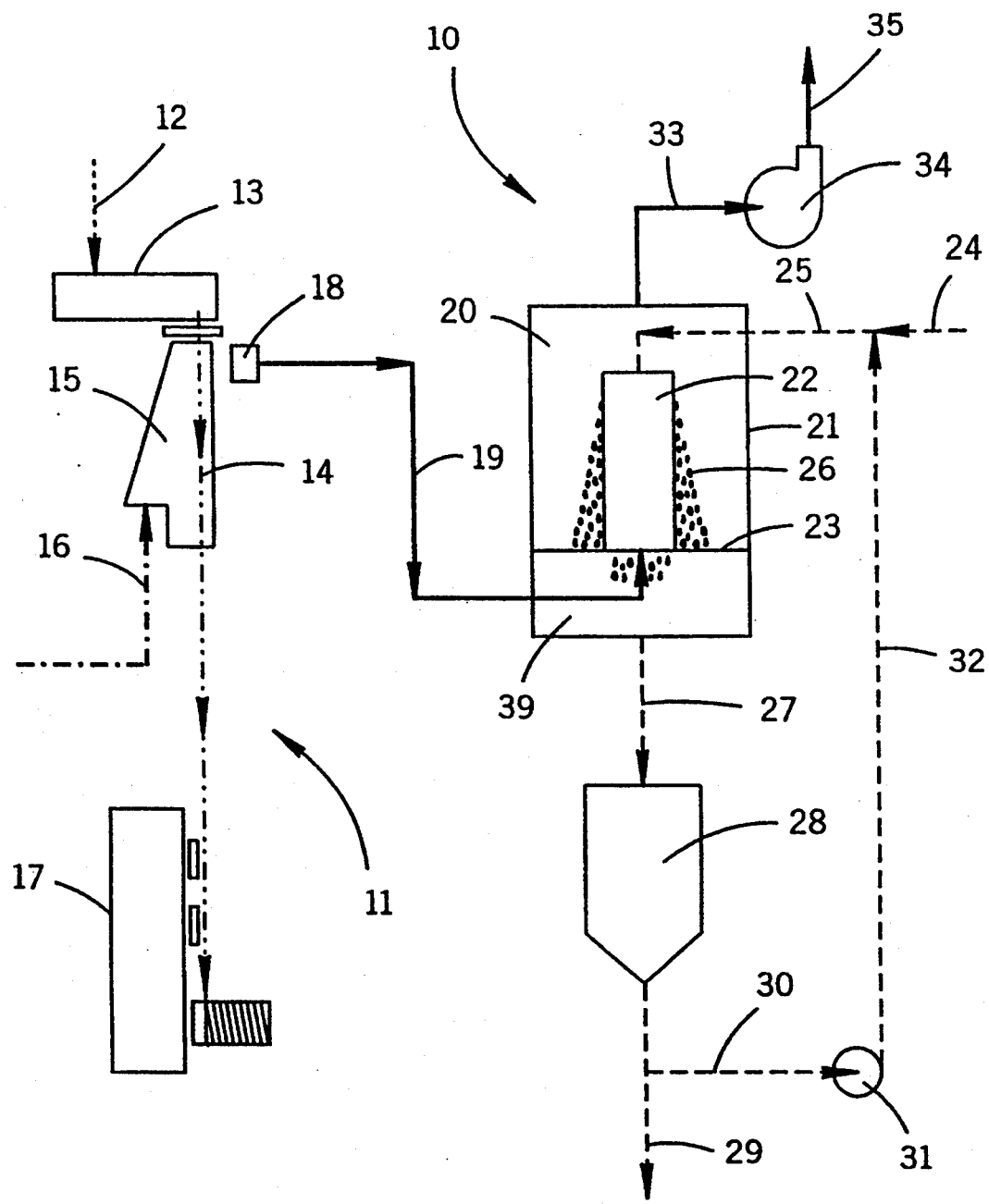
FIG. 2 is a schematic view of an apparatus for removing emissions and a fiber spinning operation.
Figure 3:
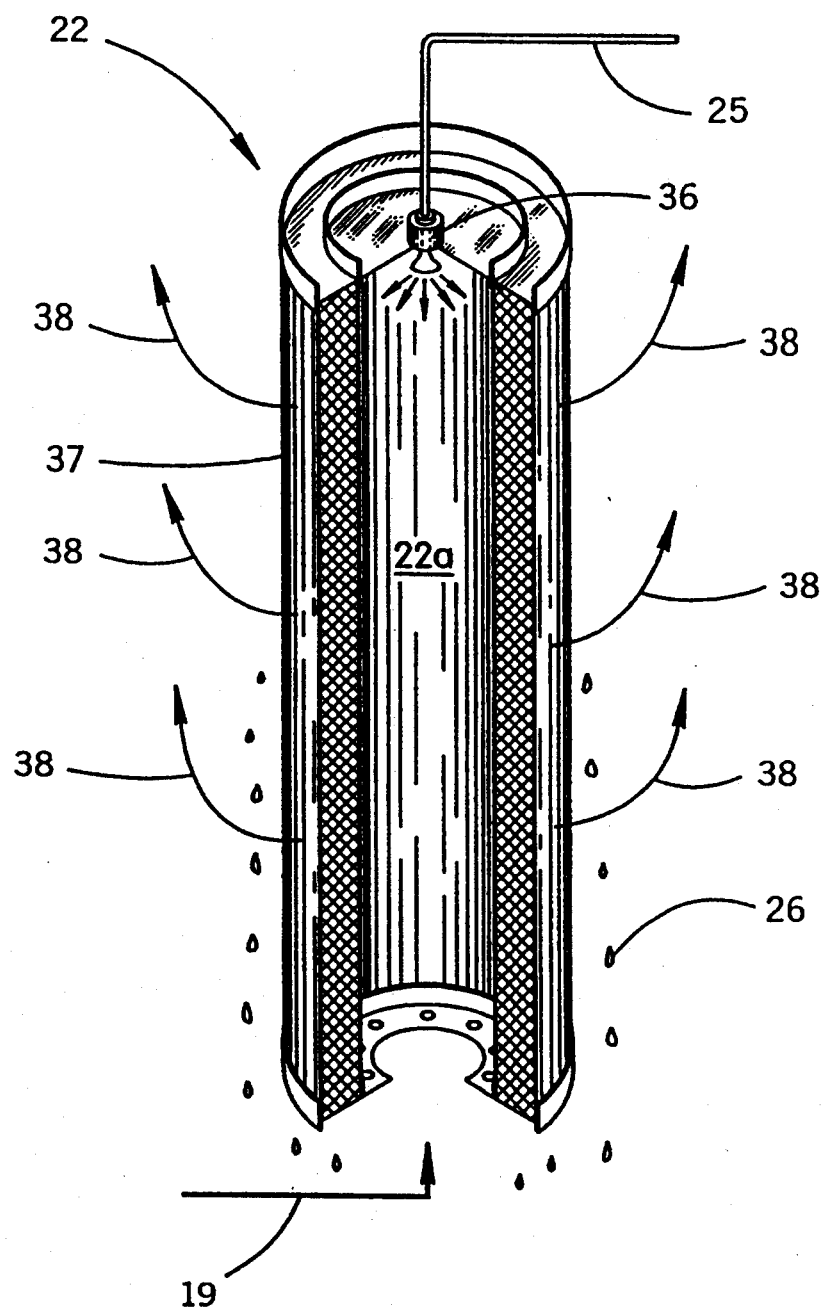
FIG. 3 is a side view of a candle filter.

FIG. 2 shows an apparatus for removing emissions (10), together with a fiber spinning operation (11). In the fiber spinning operation (11) fiber forming polymer chips (12) are fed into the extruder (13) and spun into fibers (14) which are quenched in the quench cabinet (15) with quench air (16). The quenched fibers are optionally drawn and textured, which is not shown in FIG. 2 and wound on packages with the winding machine (17).

The quench air (16) picks up and removes the emissions like monomers and oligomers, which evaporate from the hot surface of the fibers in the quench cabinet (15). From here the quench air containing the emissions is conducted through the header duct (18), the duct (19) and into the candle filter (22) of the candle filter housing (20). The candle filter housing (20) comprises the candle filter (22) which is located on a structural support (23). The candle filter (22) comprises according to FIG. 3 the filter casing (37) and the nozzle (36). A solvent, from the solvent supply (24) or a solvent from pipe (32), is conducted through the pipe (25) to the top or the bottom of candle filter (22), where it is sprayed into the central cavity (22a) of the filter (22) in a direction preferably against, or with, the flow of the quench air containing the emissions and thereby washing out the emissions and leaving the candle filter (22) in form of the liquid (26) which is collected in the reservoir (28) over the pipe (27).

The washed quench air exits the candle filter (22) at (38), is conducted over the duct (33) and the exhaust fan (34) and is discharged over duct (35). The emissions containing solvent is discharged from reservoir (28) over pipe (29) or recycled over pipe (30), circulation pump (31), pipe (32) and (25) to the top, or bottom, of candle filter (22), where it is sprayed again over nozzle (36) against, or with, the flow of the quench air.

An alternative apparatus without reservoir (28), pipes (30) and (32) and circulation pump (31) the emission containing solvent is discharged over pipe (27) to pipe (29).

In another alternative the quench air may be washed with a solvent before entering the candle filter (22) in duct (19) before or in sump (39).

The apparatus of the present invention is applicable besides the emission sources mentioned above to emissions released from the polymerization and thermoplastic processing of all thermoplastic polymers, especially polyamides, polyesters, polyolefins, polycarbonates, polystyrenes, polyacrylonitriles, polyurethanes, polysulfones, polyethersulfones, polyvinylchloride, copolymers and mixtures thereof.

For the manufacture of fibers all fiber forming thermoplastic materials are suitable, especially polyamides, polyesters, polyolefins, polycarbonate and polyacrylonitrile.

Suitable polyamides are nylon 6, nylon 6/6, nylon 6/9, nylon 6/10, nylon 6/12, nylon 11, nylon 12, copolymers thereof and mixtures thereof. Preferred polyamides are nylon 6 and nylon 6/6. A suitable polyester is polyethylene terephthalate.

For the manufacture of fibers, the polymer is fed into an extruder in the form of chips or granules, or as molten resin, melted and directed via jacketed Dowtherm ® (Dow Chemical, Midland Mich.) heated polymer distribution lines to the spinning head. The polymer melt is then metered by a high efficiency gear pump to a spin pack assembly and extruded through a spinnerette. The fibers are spun at a temperature of from about 180° to 350° C. according to the respective polymer with a spinning speed of from about 1000 to about 5000 m/min, dependant on the type of polymer.

In the process for the application of the apparatus of the present invention air containing the emissions is collected as follows: quench air (16) is supplied to the quench cabinet (15). Suitable quench cabinets are described for example in U.S. Pat. No. 3,619,452 the disclosure of which is herewith incorporated by reference. The quench air should be supplied as a nonturbulent stream to the melt extruded fibers, thereby cooling the fibers and picking up and removing the monomer and/or oligomer emissions in the form of an aerosol. The face velocity of the quench air in header (18) is from about 12.0 to about 30.6 m/min, preferably from about 15.0 to about 30.6 m/min and most preferred from about 19.8 to about 22.8 m/min. The face velocity of the quench air varies according to mass flow and other process parameters.

At least a portion of the air containing the emissions is directed to the candle filter housing (20) and through at least one candle filter (22). The candle filter housing (20) may contain 1, 2, 3 or more candle filters of a type candle filter (22). A suitable filter is described in U.S. Pat. No. 4,759,782, the disclosure thereof is herewith incorporated by reference. Suitable candle filters (22) comprise porous filter media. The filter may have constant pore size or tapered pore size and may be composite structures comprising multiple medium layers and/or multiple support layers. The pore size is in the range of from about 1 to 50 micrometers, preferably from about 4 to 30 micrometers and most preferred from about 5 to 20 micrometers. Fibrous filter media may be made from organic or inorganic fibers or microfibers. Exemplary organic fibers include those made from polyolefins for example, polyethylene, polypropylene, polymethylpentane, polyisobutylene, and copolymers thereof, for example, ethylenepropylene; polyesters, for example, polybutylene terephthalate and polyethylene terephthalate and polyamides for example, polyhexamethylene adipamide (nylon 6/6), polyhexamethylene sebacamide (nylon 6/10), nylon 11 (prepared from 11-amino-nonanolic acid), and homopolymers of polyepsiloncaprolactam (nylon 6), and mixtures or blends of such polymers. The fibers may be made of other polymers which can be formed into fibers and mixtures of fibers also can be used.

Suitable inorganic fibers include those made from glass, metals or metal compounds like metal titanates, e.g., potassium titanate. Preferred for the present invention is glass.

The filter fibers generally will have diameters of from about 0.1 to about 20 micrometers. The filter fibers may vary in length from relatively short staple-like microfibers of about 12.7 mm or less up to substantially continuous filaments several feet or more in length. Typically, the median length to diameter ratio of the fibers will be in the range of from 500 to 1,000.

The thickness of the candle filter casing (37) comprising the filter media depends from the size of the whole candle filter and is from about 25.4 to about 127 mm, preferably from about 50.8 to about 76.2 mm.

A typical size of the filters to handle 56.6 m$^3$/min is 0.61 m in outside diameter by 3.05 m tall. An example of this filter is a KOCH Flexfiber Mist Eliminator Type BD-SRF-MKII 24120 constructed of special glass fiber and 316L stainless steel. The filter housing can be designed to have, for example 50% or 100% additional capacity for either lower pressure drops and higher efficiencies and the capability of bypassing one side of the house for maintenance. Such a design would include two independent houses welded together, each side capable of handling 100% or any range of the flow as long as the face velocity in the filters is less than or equal to 12.19 m/min.

A nozzle (36) is located at the top of the candle filter (22). A solvent is sprayed through the nozzle (36) with or preferably against the flow of the quench air. An optional nozzle is located in duct (19) in the sump (39) to aid in washing and saturating the air stream. The solvent is sprayed preferably countercurrent to the air flow and recycled by gravity into reservoir (28) over pipe (27).

Suitable nozzles are wide angle, non-clogging brass or stainless steel.

The solvent washes the monomers and/or oligomers out of the quench air and out of the filter media. Suitable solvents are those, which are able to solve or disperse the monomers or oligomers, which depends on the nature of the respective thermoplastic polymer. They comprise water and aqueous mixtures like water/caprolactam, water/ethylene glycol, water/formic acid and the like, alcohols like methanol, ethanol, propanol, ethylene glycol, diethylene glycol and the like; amines like triethanolamine, triethylamine and the like; organic and inorganic acids like formic acid, acetic acid, sulfuric acid and the like; esters like ethyl acetate, ketones like acetone and cyclohexanone, ethers like dibutyl ether, paraffins like $C_6$— to $C_{18}$— paraffins like octane, decane and mixtures thereof. Water or a water/caprolactam solution is preferred.

The solvent rinses through the candle filter (22).

The solvent containing the monomers and/or oligomers is conducted from the outside and inside surface of the candle filter (22) and collected in the reservoir (28), from where it exits the system over duct (29) or is recycled through pipes (30), (32) and (25) by the solvent circulation pump (3).

The washed quench air exits the candle filter (22) at (38) and exits the candle filter housing (20) over the ducts (33), (35) and the exhaust fan (34). The removal rate of particles greater than 1 micron particles is very high, with removal of less than 1 micron particles being dependant on the face velocity in the candle filter. A face velocity in the candle filter of less than 12.19 m/min is recommended, and the efficiency of removal of submicron size particles is inversely proportional to the face velocity.

EXAMPLE:

In a Nylon 6 fiber [Ultramid ® B from BASF AG, Germany; RV=2.6 (1% solution in 90% formic acid at 25° C.)]production facility, a candle filter system was installed on a side stream quench exhaust. Approximately 4.25 m$^3$/min of caprolactam-laden quench air was directed to one 0.38 m outside diameter (0.33 m inside diameter)×1.07 m candle. The air entered the bottom of the filter house in the sump and exhausted from the candle in the upper portion of the house. The face velocity of the exhaust air in the candle was approximately 3.66 m/min. A nozzle capable of delivering 1.14×10$^{-2}$ m$^3$/min of filtered water was directed countercurrently at the incoming caprolactam-laden air where the inlet duct met the filter house sump. The spray nozzle was moved to the base of the candle for co-current cleaning of the candle on a manual, intermittant basis.

The candle was manually cleaned with the filtered water for 15 minutes before an efficiency test. The efficiency of the candle filter was over 95% for removal of caprolactam in the air stream.

We claim:

1. An apparatus for continuously removing monomeric and/or oligomeric emissions entrained in a flow of enfissions-containing air, which comprises:
   (i) a header for collecting the emissions-containing air;
   (ii) a candle filter which includes a candle filter housing and a filter medium within the candle filter housing which defines a central cavity;
   (iii) a duct which fluid-connects the header and the candle filter housing such that said flow of emissions-containing air is directed from said header and into said interior cavity of said candle filter;

(iv) emissions-control means operatively connected to the candle filter for (a) bringing a continuous flow of the emissions-containing air into contact with a solvent for the emissions contained in the emissions-containing air within the central cavity of the candle filter such that the emissions contained in the enfissions-containing air are captured by the solvent to thereby form an emissions-laden solvent which is carried by a substantially enfissions-free air flow; while simultaneously (b) causing the substantially emissions-free air flow carrying the enfissions-laden solvent to pass through the filter medium of the candle filter to separate the substantially emissions-free air flow from the emissions-laden solvent; and (v) discharge ducts connected operatively to said filter candle housing for respectively removing the substantially emissions-free air flow and the emissions-laden solvent as respective separate streams from the candle filter, whereby the enfissions contained in the air are removed.

2. The apparatus according to claim 1, wherein said filter medium of the candle filter is made from organic or inorganic fibers or microfibers.

3. The apparatus according to claim 2, wherein the organic fibers or microfibers are selected from the group consisting of polyolefins, polyesters, polyamides and copolymers thereof.

4. The apparatus according to claim 2, wherein the inorganic fibers or microfibers are selected from the group consisting of glass, metals, metal compounds, and mixtures thereof.

5. The apparatus according to claim 1, wherein the emissions-control means includes a solvent supply, a pipe and a nozzle, the solvent supply being connected through the pipe with the nozzle.

6. The apparatus according to claim 1, wherein the emissions-control means includes a fan.

7. The apparatus according to claim 1, wherein said emissions-control means includes a reservoir fluid-connected to the filter housing.

8. The apparatus according to claim 7, wherein said emissions-control means includes recirculation means which is fluid-connects said reservoir and said filter housing for recirculating the solvent from the reservoir to the candle filter.

9. The apparatus according to claim 8, wherein the recirculation means includes a circulation pump and a pipe, the circulation pump being connected through the pipe with the reservoir and the candle filter.

10. The apparatus according to claim 1, further comprising rinsing means for rinsing the duct before the candle filter, connected to the duct.

11. The apparatus according to claim 10, wherein the rinsing means includes a solvent supply, a pipe and a nozzle, the solvent supply being connected through the pipe with the nozzle.

12. The apparatus according to claim 1, further comprising at least two of said candle filters, and at least two of said emissions-control means each of which is connected operatively to a respective one of said candle filters.

* * * * *